(12) United States Patent
Lee

(10) Patent No.: US 7,815,307 B2
(45) Date of Patent: Oct. 19, 2010

(54) GLASSES WITH LENGTH-ADJUSTABLE TEMPLES

(76) Inventor: Sung Kyun Lee, #201 Yooji Villa, 30-5 Samjeon-dong, Songpa-gu, Seoul 138-837 (KR)

( * ) Notice: Subject to any disclaimer, the term of this patent is extended or adjusted under 35 U.S.C. 154(b) by 0 days.

(21) Appl. No.: 12/301,166

(22) PCT Filed: May 15, 2007

(86) PCT No.: PCT/KR2007/002379

§ 371 (c)(1),
(2), (4) Date: Nov. 17, 2008

(87) PCT Pub. No.: WO2007/136185

PCT Pub. Date: Nov. 29, 2007

(65) Prior Publication Data

US 2009/0153792 A1    Jun. 18, 2009

(30) Foreign Application Priority Data

May 19, 2006    (KR) ...................... 10-2006-0045176

(51) Int. Cl.
G02C 5/20    (2006.01)
(52) U.S. Cl. ...................... 351/118; 351/121

(58) Field of Classification Search .................. 351/111, 351/116–121

See application file for complete search history.

(56) References Cited

U.S. PATENT DOCUMENTS

| 1,751,804 | A | * | 3/1930 | Fischer | ....................... 351/118 |
| 2,333,738 | A | * | 11/1943 | Peck et al. | ................... 351/229 |
| 4,799,782 | A | * | 1/1989 | Tuttle | ......................... 351/118 |
| 4,804,260 | A | * | 2/1989 | Anger | ........................ 351/118 |

FOREIGN PATENT DOCUMENTS

| JP | 7-244262 A | 9/1995 |
| JP | 2005-43800 A | 2/2005 |

* cited by examiner

*Primary Examiner*—Huy K Mai
(74) *Attorney, Agent, or Firm*—Porter, Wright, Morris & Arthur, LLP

(57) ABSTRACT

The present invention provides glasses having temples adjustable in length according to physical conditions of a user. The glasses comprise a main body including lenses, temples formed with ear-holding parts at rear ends curvedly and grooves at front ends, hinge elements foldably connection the temples to the body part, insert elements fitted and fixed into the groves of the temples and formed with screw holes, and control screws axially inserted into the hinge elements to rotate freely and screw-coupled in the screw holes of the insert elements to move the temples to and fro.

8 Claims, 2 Drawing Sheets

[Fig. 1]
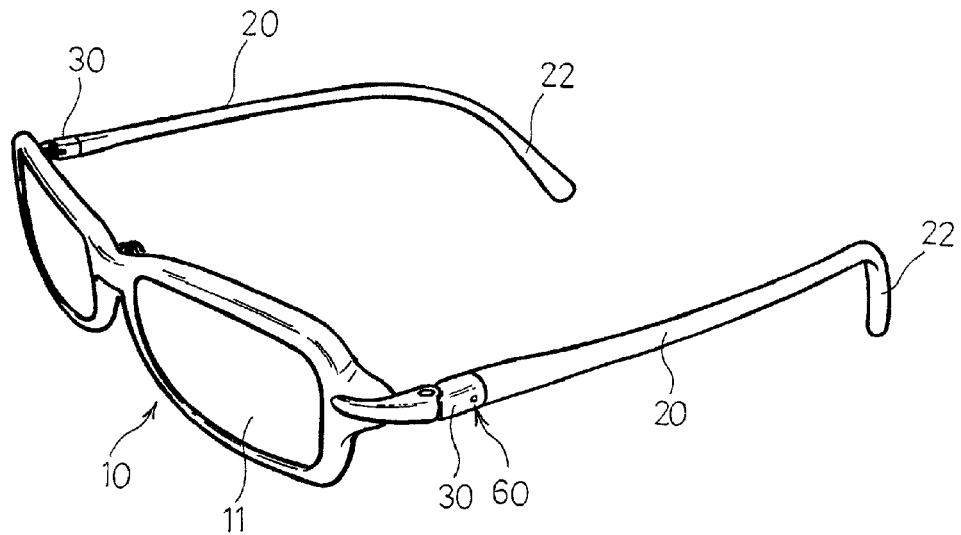
[Fig. 2]
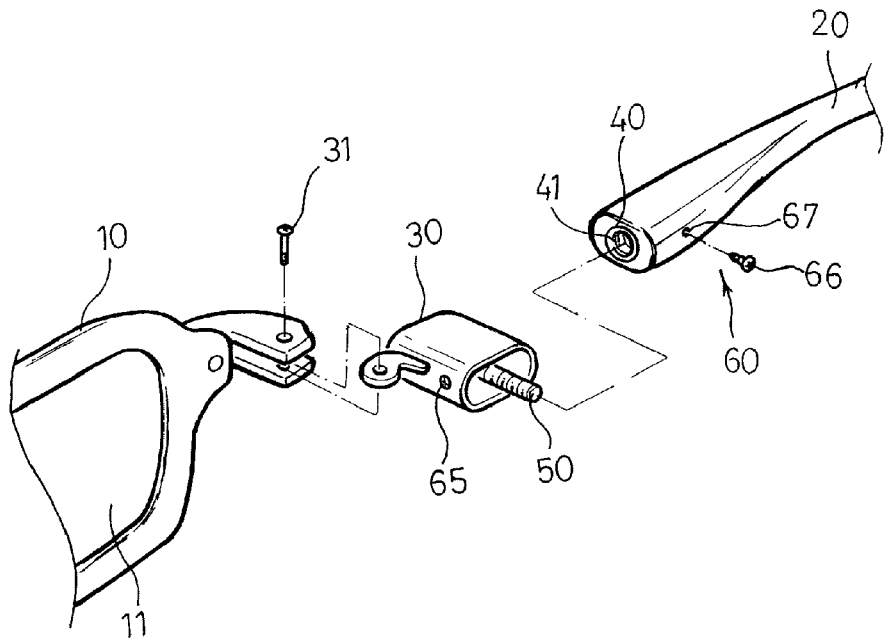
[Fig. 3]
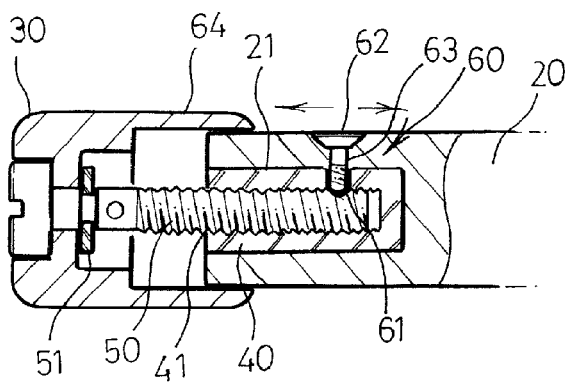

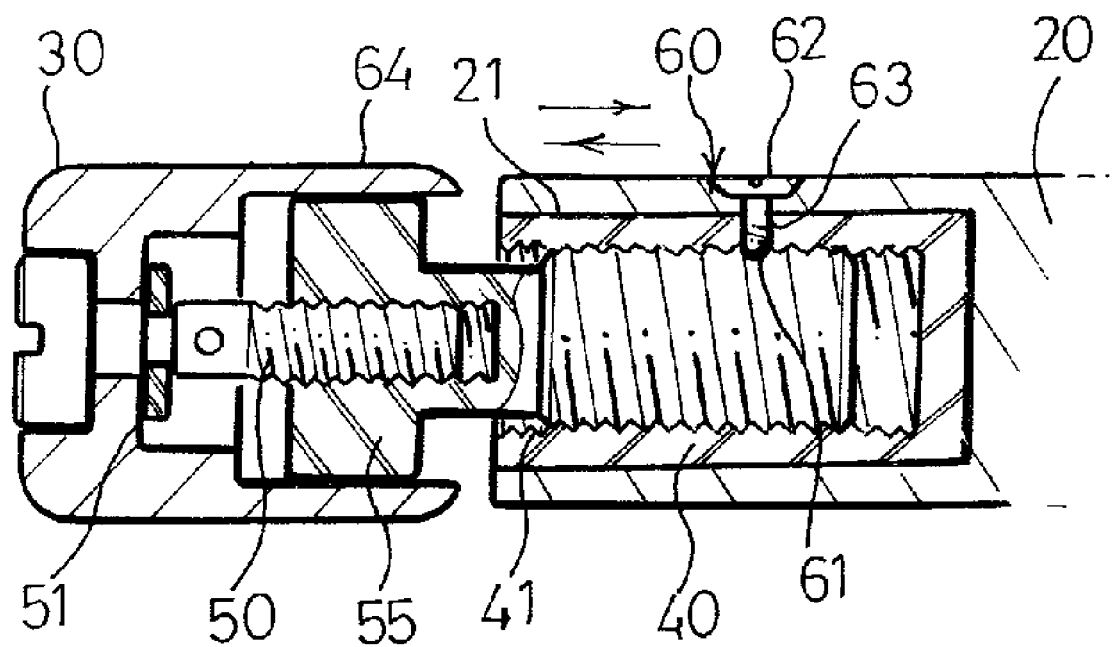
[Fig. 4]

GLASSES WITH LENGTH-ADJUSTABLE TEMPLES

TECHNICAL FIELD

The present invention relates to glasses with length-adjustable temples, and more particularly to glasses, in which temples are easily controllable in length according to physical conditions of a user wearing the glasses so that the user may wear the glasses on his face stably and comfortably. Further, the temples may be folded by using hinges in the case of keeping or carrying.

BACKGROUND ART

As for the temples, steel materials and synthetic resin materials are widely used.

In the case of manufacturing the temples with the steel materials, elements formed of synthetic resin materials for easy deformation and comfort wearing are connected to ear portions of the temples. Therefore, two or more elements respectively formed of different materials have to be coupled with each other.

In the meantime, the temples formed of the synthetic resin materials have advantages of cost-saving and easy handling, so that such the temples may be manufactured with various size and shape and delivered to opticians.

Further, the glasses having the synthetic resin temples may be selected by users with approximation in the length or width of the temples and controlled properly by heating the temples with a heater at a proper temperature for correcting the shape and positions of the ear portions as desired, so that the user may wear the glasses after proper fitting to his face.

DISCLOSURE OF INVENTION

Technical Problem

In the recent days, however, high cost materials, which are not controllable in the shape and size even in the manufacturing process have been widely spread out.

That is, wooden materials, tortoise shells, horns, jewelry, shape-memory materials and super elastic materials are utilized in manufacturing the glasses, wherein control of the shape and the size is impossible or difficult.

Therefore, glasses made of such materials are provided to users in the order-made manner for the control of the width between the temples and the length of the temples.

As described hereinabove, temples of the glasses formed of the rigid materials, the shape-memory materials and the super elastic materials, of which length and ear portion shape are not deformable, are circulated in the order-made manner only.

However, if the temples are damaged or correction of the length thereof is required during use, the glasses cannot be corrected by the opticians and the like.

Therefore, the glasses are returned to manufacturers thereof and got back by the users after the correction, wherein this procedure causes inconvenience in use so that the glasses formed of the rigid materials, the shape-memory materials and the super elastic materials could not widely spread in spite of increasing demands thereon.

In general, the damage of the glasses is generated in the temples mainly. However, places to repair the damaged glasses are limited, so that the users have to request costly and time consuming outside services incurring economical and temporal losses.

In such glasses, a distance from lenses to user's eyes is very important, wherein a fine distance in the range of 1-2 mm may cause a considerable difference in the corrected sight of the lenses.

Further, nose pads and ear portions directly contact user's nose and ears, and pulling force of the nose pads and the ear portions apply pressure to the contact portions.

Therefore, control of the fine distance in the range of 1-2 mm may differ the intensity of such pressure and cause considerable difference in the user's wearing comfort.

Technical Solution

Therefore, the present invention is derived to resolve the above and any other disadvantages of the prior art.

According to the present invention, there is an object to provide an order-made type glasses, which may be controlled easily, especially, in the length by opticians or users regardless of characteristics of materials, from which the glasses are made, such as stiffness or handling-impossibility.

According to the present invention, there is another object to provide glasses, in which fine distance control may be possible in the length of temples so that improvement in the sight correction or wearing comfort may be realized when a user wears the glasses.

In order to achieve the above objects, according to the present invention, there is provided glasses comprising a main body including lenses, temples having ear portions formed curvedly at rear ends and grooves at front ends, hinge elements foldably connecting the temples to the main body, insert elements fitted and fixed into the grooves of the temples and formed with screw holes, and control screws axially mounted to the hinge elements to rotate freely and screw-coupled in the screw holes of the insert elements for moving the temples to and fro.

Advantageous Effects

Therefore, the temples may be finely moved to and fro from the main body so that optimum sight and optimum wearing comfort may be obtained when a user wears the glasses.

Further, the temples formed of expensive materials such as shape-memory materials and super elastic materials, or stiff materials, which are not deformed by heating, may be easily controlled in the length by opticians for the user to wear the glasses in the optimum state.

Therefore, the temples formed of the expensive materials may be spread widely and controlled or repaired in the length by the opticians easily with economical profits.

BRIEF DESCRIPTION OF THE DRAWINGS

The objects, features and advantages of the present invention will be more clearly understood from the following detailed description in conjunction with the accompanying drawings, in which FIG. 1 is a perspective view showing glasses according to a preferred embodiment of the present invention;

FIG. 2 is a perspective view showing principal parts of the glasses according to the present invention, wherein the principal parts are in a disassembled state;

FIG. 3 is a partially taken and expanded sectional view showing the principal parts; and FIG. 4 is a partially taken and expanded sectional view showing glasses according to another preferred embodiment of the present invention.

BEST MODE FOR CARRYING OUT THE INVENTION

Now, the glasses according to the present invention will be described in more detail with reference to the accompanied drawings.

Referring to the accompanied drawings, FIG. 1 is a perspective view showing glasses according to a preferred embodiment of the present invention, FIG. 2 is a perspective view showing principal parts of the glasses, which are in a disassembled states, FIG. 3 is a partially taken view showing the principal parts in an assembled state, and FIG. 4 is a partially taken view showing glasses according to another preferred embodiment of the present invention.

According to the present invention, a main body 10 of the glasses has two lenses 11 and is mounted with temples 20 through hinge elements 30, which connect the temples to the main body 11 foldably.

The temples 20 according to the present invention are formed of various materials such as synthetic resin or non-metal materials, wherein wooden materials, tortoise shells, horns, jewelry, shape-memory materials and super elastic materials may be selected as the materials for the temples 20.

In general, the wooden materials, the tortoise shells, the horns, and the jewelry are not deformable in shape in spite of heating carried out by a heating machine provided in an optician's shop.

These materials are cut by a cutter (now shown) by a certain length required for forming the temples 20 in the state that the hinge elements 30 are mounted thereto, after measuring a distance from the main body 10 to ear portions 22 of the temples 20 according to a face shape of a user who wants to wear the glasses.

The cutter is to be a cutting tool such as a grinder or a power saw having the same function with the grinder.

The temples 20 are curvedly formed with the ear portions 22 at rear ends to be suspended on ears of the user by a cutting or similar step in the manufacturing procedure thereof and formed with grooves 21 at front ends.

Insert elements 40 are firmly fitted into the grooves 21, wherein adhesive elements such as adhesive agents may keep the firm fitting state of the insert elements 40 and the temples 20 without relative movement therebetween.

The hinge elements 30 are positioned between the temples 20 and the main body 10, wherein the hinge elements 30 are coupled with rear parts of the main body 10 and connected thereto rotatively by pins 31.

The insert elements 40, which are fixed into the grooves 21 of the temples 20, are formed with screw holes 41, in which control screws 50 are screw-coupled.

The control screws 50 are rotatable in the hinge elements 30 by snap rings 51 but kept not to escape from the hinge elements 30.

Referring to FIG. 3, the control screws 50 are directly screw-coupled with the insert elements 40, which are fixed to the temples 20, and the hinge elements 30 are integrally formed with hollow covers 64 to surround front outsides of the temples 20, so that the temples 20 become slidable by the control screws 50.

Referring to FIG. 4, slide bolts 55 are positioned between the control screws 50 and the insert elements 40.

The insert elements 40 are firmly screw-coupled with the slide bolts 55 and head parts of the slide bolts 55 are fitted into the hinge elements 30 to be coupled with the control screws 50, so that the slide bolts 55 slide to and fro together with the temples 20 in response to rotation of the control screws 50.

In order to carry out fine length control of the temples 20 while the temples 20 are assembled into the main body 10 in the optimum state, position-fixing elements 60 may be mounted to installation positions of the temples 20 for preventing the temples 20 from moving without intension.

FIG. 2 and FIG. 3 respectively show a perspective view and a partially taken sectional view of the position-fixing elements 60.

The control screws 50 are formed with position determining grooves 61 and the temples 20 are formed with screw assembling holes 63 for passing screws 62.

Therefore, the length of the temples 20, to which the insert elements 40 are fixed, is finely controlled by rotating the control screws 50 forward or backward. Then, the screws 62 are fixed to the position determining grooves 61 through the screw assembling holes 63 when the ear portions 22 are positioned to user's ears in optimum contact. Conclusionally, the user may stably wear the glasses in the state that the temples 20 are controlled in the optimum length.

In general, the temples 20 of the glasses are not formed circularly but formed in the shape of rounded rectangles or ovals. Therefore, the covers 64 are positioned to surround the hinge elements 30 and the temples 20 partially by moving the covers 64, so that the movement caused by rotation of the temples 20 may be prevented.

In order to stabilize the coupling further, the covers 64 are formed with assembling holes 65 and the temples 20 are formed with screw holes 67 so that the covers 64 are preferably coupled with the temples 20 by inserting screws 66 into the assembling holes 65 and the screw holes 67.

If further length control or repair is required during use, the above parts are disassembled in the reverse sequence from the above assembling procedure and the front ends of the temples 20 are grinded by using the grinder or the power saw. Then the temples 20 may be re-assembled after desired length control.

If the length of the temples 20 is required to be extended finely, the length between the main body 10 and the temples 20 is extended by rotating the control screws 50 and the temples 20 are coupled with the main body 10 in the above procedure, which is not shown.

As such the main bodies and the temples in the above-described structure of the present invention are supplied to the opticians and the user selects a desired glasses frame directly in the opticians' shops, the selected glass frame is attached with a scale for actual measurement to determine how much the temples are to be controlled in length and unnecessary portions of the temples are cut away. Then, the screw holes or the assembling holes are machined in a machining part for fixing and assembling of the temples to the main body. Such length-controlled temples are assembled through fine distance control and instantly completed as optimum glasses in front of the user.

Therefore, the materials such as the wooden materials, the tortoise shells, the horns, the jewelry, the shape-memory materials and the super elastic materials, which have not been revitalized because of their natural characteristics difficult or impossible to control, may be complemented in such characteristics to be easily controlled by the opticians instantly and widely spread as hard and high-grade glasses in the markets.

Further, the intensity of the pulling force of the nose pads and the ear portions, and a distance between the lenses and user's eyes may be determined through fine distance control in the range of 1-2 mm, so that considerable improvement of sight and wearing comfort may be realized.

The control manner of the temples is compatibly applicable and service network may be realized through the opticians at a short distance for resolving the inconvenience of the users and revitalizing the markets for the materials employed for manufacturing such high-grade temples of the glasses, thereby helping the users to present various and unique atmosphere.

The invention claimed is:

1. Glasses with length-adjustable temples comprising:
    a main body including lenses;
    temples having ear portions curvedly formed at rear ends and grooves at front ends;
    hinge elements foldably connecting the temples to the main body;
    insert elements fitted and fixed into the grooves of the temples and formed with screw holes; and
    control screws axially mounted to the hinge elements to rotate freely; and
    slide bolts positioned between the insert elements and the control screws and screw-coupled with the screw holes of the inserts so that the slide bolts move to and fro together with the temples in response to rotation of the control screw.

2. The glasses as claimed in claim 1, further comprising position fixing elements including position determining grooves formed in the control screws, screw assembling holes formed in the temples for passing screws, and the screws contacting the position determining grooves by passing through the screw assembling holes.

3. The glasses as claimed in claim 1, wherein the hinge element is further coupled to the temples with screws extending into assembling holes in the hinge elements and screw holes in the temples to prevent unintentional movement of the temples.

4. The glasses as claimed in claim 1, wherein the slide bolts have head parts slidingly fitted into the hinge elements and coupled with the control screws.

5. The glasses as claimed in claim 1, wherein control screws are secured to the hinge elements with snap rings.

6. Glasses with length-adjustable temples comprising:
    a main body including lenses;
    temples having ear portions curvedly formed at rear ends and grooves at front ends;
    hinge elements foldably connecting the temples to the main body;
    insert elements fitted and fixed into the grooves of the temples and formed with screw holes; and
    control screws axially mounted to the hinge elements to rotate freely and screw-coupled in the screw holes of the insert elements for moving the temples to and fro; and
    position fixing elements including position determining grooves formed in the control screws, screw assembling holes formed in the temples for passing screws, and the screws contacting the position determining grooves by passing through the screw assembling holes to prevent unintentional movement of the temples.

7. The glasses as claimed in claim 6, wherein the hinge element is further coupled to the temples with screws extending into assembling holes in the hinge elements and screw holes in the temples to prevent unintentional movement of the temples.

8. The glasses as claimed in claim 6, wherein control screws are secured to the hinge elements with snap rings.

\* \* \* \* \*